(12) United States Patent
Morsy et al.

(10) Patent No.: US 11,862,772 B2
(45) Date of Patent: Jan. 2, 2024

(54) USER-DEFINED BATTERY RECHARGING SYSTEMS AND METHODS

(71) Applicants: Mohamed Khaled Morsy, Bridgeville, PA (US); Matthew Joseph Rosenblatt, Randolph, NJ (US); Nolan Matthew Zinn, Canonsburg, PA (US); Nicolas Jayant Kshatri, Allentown, PA (US)

(72) Inventors: Mohamed Khaled Morsy, Bridgeville, PA (US); Matthew Joseph Rosenblatt, Randolph, NJ (US); Nolan Matthew Zinn, Canonsburg, PA (US); Nicolas Jayant Kshatri, Allentown, PA (US)

(73) Assignee: Canal Electronics LLC, Bridgeville, PA (US)

( * ) Notice: Subject to any disclaimer, the term of this patent is extended or adjusted under 35 U.S.C. 154(b) by 422 days.

(21) Appl. No.: 15/940,737

(22) Filed: Mar. 29, 2018

(65) Prior Publication Data

US 2019/0305382 A1 Oct. 3, 2019

(51) Int. Cl.
*H02J 7/00* (2006.01)
*H01M 10/44* (2006.01)
*H01M 10/0525* (2010.01)

(52) U.S. Cl.
CPC ....... *H01M 10/44* (2013.01); *H01M 10/0525* (2013.01); *H02J 7/0071* (2020.01)

(58) Field of Classification Search
CPC ...... H02J 7/0021; H02J 7/0071; H02J 7/0048; H01M 10/44
See application file for complete search history.

(56) References Cited

U.S. PATENT DOCUMENTS

| 3,599,073 | A | * | 8/1971 | Wilson | H02J 7/00719 |
| | | | | | 320/144 |
| 5,623,194 | A | * | 4/1997 | Boll | B60L 53/305 |
| | | | | | 320/137 |
| 6,094,033 | A | * | 7/2000 | Ding | H01M 10/44 |
| | | | | | 320/132 |
| 6,232,750 | B1 | * | 5/2001 | Podrazhansky | H02J 7/00711 |
| | | | | | 320/139 |
| 9,895,990 | B2 | * | 2/2018 | Giusti | B60L 3/12 |
| 2010/0123436 | A1 | * | 5/2010 | Herrod | H02J 7/00 |
| | | | | | 320/132 |
| 2010/0283432 | A1 | * | 11/2010 | Ellwanger | B60K 35/00 |
| | | | | | 320/155 |
| 2011/0018679 | A1 | * | 1/2011 | Davis | H02J 50/12 |
| | | | | | 340/3.1 |
| 2012/0249088 | A1 | * | 10/2012 | Abe | H02J 7/042 |
| | | | | | 320/164 |

(Continued)

*Primary Examiner* — Robert Grant
(74) *Attorney, Agent, or Firm* — Duncan Galloway Greenwald PLLC; Kevin T. Duncan (57) ABSTRACT

Battery recharging devices include a power port, a user interface module for receiving a user input, a charge profile generator responsive to the user input for producing a charge profile, and a switch for enabling a current to flow to the battery based upon the charge profile. The charge profile is associated with a set of charges that are adapted to be applied to the battery during a user-defined time period. The set of charges comprises a first charge adapted to be applied to the battery during the user-defined time period during which the battery does not recharge. Methods of recharging batteries are also disclosed.

21 Claims, 5 Drawing Sheets

(56) References Cited

U.S. PATENT DOCUMENTS

| | | | |
|---|---|---|---|
| 2013/0082662 A1* | 4/2013 | Carre | H02J 7/0068 |
| | | | 320/134 |
| 2013/0134940 A1* | 5/2013 | Tominaga | H02J 7/0071 |
| | | | 320/109 |
| 2013/0249483 A1* | 9/2013 | Iida | B60L 58/13 |
| | | | 320/109 |
| 2017/0288418 A1* | 10/2017 | Alexander | H02J 7/007 |
| 2018/0090941 A1* | 3/2018 | Ramachandran | H02J 7/00036 |
| 2018/0090947 A1* | 3/2018 | Berkowitz | H02J 7/0071 |
| 2018/0226826 A1* | 8/2018 | Sherstyuk | H02J 7/00711 |
| 2019/0334354 A1* | 10/2019 | Mizukami | H02J 7/0047 |

* cited by examiner

USER-DEFINED BATTERY RECHARGING SYSTEMS AND METHODS

FIELD OF THE INVENTION

The present invention relates to systems and methods for recharging batteries.

BACKGROUND

Rechargeable batteries are used in many devices including mobile phones, laptop and/or portable computers, tablets, personal digital assistants, camcorders, power tools and automobiles to name a few.

The temperature of a battery increases while it is recharging. Likewise, when a device uses battery power to operate, the battery temperature also increases.

The increase in temperature decreases the number of times a battery may be recharged and thus decreases the "lifetime" of the battery. When a battery is no longer able to be recharged, some devices, such as some mobile phones, are no longer operational because the battery cannot be replaced in a cost-effective manner. On devices having a replaceable battery, the user is faced with little choice but to purchase an expensive replacement battery. The more the device is worth, the more likely the user will pay to purchase another expensive battery.

Much work has been done to attempt to decrease the drastic increase in temperature batteries undergo when recharging. For example, U.S. Pat. No. 8,922,329, incorporated by reference as if set forth in its entirety, recognizes that increased battery temperature may decrease battery life, stating that "the [battery] charger can take all night to slow charge the battery, reducing heating of the battery and extending the battery life." Id. at 11:56-58. According to Texas Instruments (through its acquisition of National Semiconductor), a "[s]low charge is usually defined as a charging current that can be applied to the battery indefinitely without damaging the cell (this method is sometimes referred to as a trickle charging)." http://www.ti.com/lit/an/snva557/snva557.pdf. However, https://www.pcworld.com/article/2683012/want-lithiumion-batteries-to-last-slow-charging-may-not-be-the-answer.html, a Sep. 14, 2014 entitled Want lithium-ion batteries to last? Slow charging may not be the answer explains that a team of researchers from the Massachusetts Institute of Technology, Sandia National Laboratories, Samsung Advanced Institute of Technology America and Lawrence Berkeley National Laboratory has challenged the long-held notion that slowly charging a battery helps prolong its life.

Given the widespread use of batteries today and in the foreseeable future, a need exists for better systems and methods for recharging batteries.

SUMMARY

We have recognized that a need exists to be able to recharge a rechargeable battery without constantly applying power, via an electrical potential [i.e., voltage] and current, to the battery while it is recharging. Further, we have recognized that having a charge profile based upon a user-defined input will lower the temperature endured by a recharging battery, extending its life. More specifically, extending battery life is aided by using a battery recharging device comprising a power port; a user interface module for receiving a user input, the user input comprising a user-defined time period, the user-defined time period signifying a start time and an end time, the start time being a first time prior to which recharging does not occur, the end time being a second time after which recharging does not occur; a charge profile generator for producing a charge profile, the charge profile generator responsive to the user input, the charge profile associated with a set of charges that are adapted to be applied to the battery during the user-defined time period, the set of charges comprising a first charge adapted to be applied to the battery after the start time and prior to the end time during which the battery does not recharge; and a switch connected to the power port for enabling a current to flow to the battery based upon the charge profile.

In a first embodiment the present invention provides a method of recharging a battery comprising: receiving a user input comprising a user-defined time period, the user-defined time period signifying a start time and an end time, the start time being a first time prior to which recharging does not occur, the end time being a second time after which recharging does not occur; based upon the user-defined time period, determining a charge profile, the charge profile associated with a set of charges that will be applied to the battery during the user-defined time period, the set of charges comprising a first charge to be applied to the battery after the start time and prior to the end time during which the battery does not recharge; and recharging the battery based upon the charge profile.

The method may further comprise wherein the set of charges is associated with an additional set of time portions within the user-defined time period during which the battery does not recharge. The battery may be a lithium-ion battery. The user input may be session-specific and relate to an upcoming recharging event. The user input may further comprise a final desired state of charge. The final desired state of charge may be greater than seventy percent and less than one hundred percent. The recharging step may comprise applying a charging current associated with the charging profile to the battery using a USB connection.

In a second embodiment, the present invention provides a device for recharging a battery comprising: a power port; a user interface module for receiving a user input, the user input comprising a user-defined time period, the user-defined time period signifying a start time and an end time, the start time being a first time prior to which recharging does not occur, the end time being a second time after which recharging does not occur; a charge profile generator for producing a charge profile, the charge profile generator responsive to the user input, the charge profile associated with a set of charges that are adapted to be applied to the battery during the user-defined time period, the set of charges comprising a first charge adapted to be applied to the battery after the start time and prior to the end time during which the battery does not recharge; and a switch connected to the power port for enabling a current to flow to the battery based upon the charge profile.

The device may further comprise wherein the set of charges is associated with an additional set of time portions within the user-defined time period during which the battery is not adapted to recharge. The battery may be a lithium ion battery. The user input may be session-specific and relate to an upcoming recharging event. The user input may further comprise a final desired state of charge. The final desired state of charge may be greater than seventy percent and less than one hundred percent. The device of claim 8 wherein the power port comprises a USB port.

In a third embodiment, the present invention provides a device for recharging a battery comprising: a power port; a charge profile generator for producing a charge profile, the charge profile associated with a set of charges that are adapted to be applied to the battery, the set of charges comprising a first charge during which the battery does not recharge; and a switch connected to the power port for enabling a current to flow to the battery based upon the charge profile.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

As background, the figures that will be described relate to two different embodiments, and methods of operation thereof, of a battery recharging device for a mobile phone. As will be described in more detail and is apparent to those skilled in the art, the battery recharging device may take different forms and be used with various battery powered devices.

Embodiments

Figure 1:
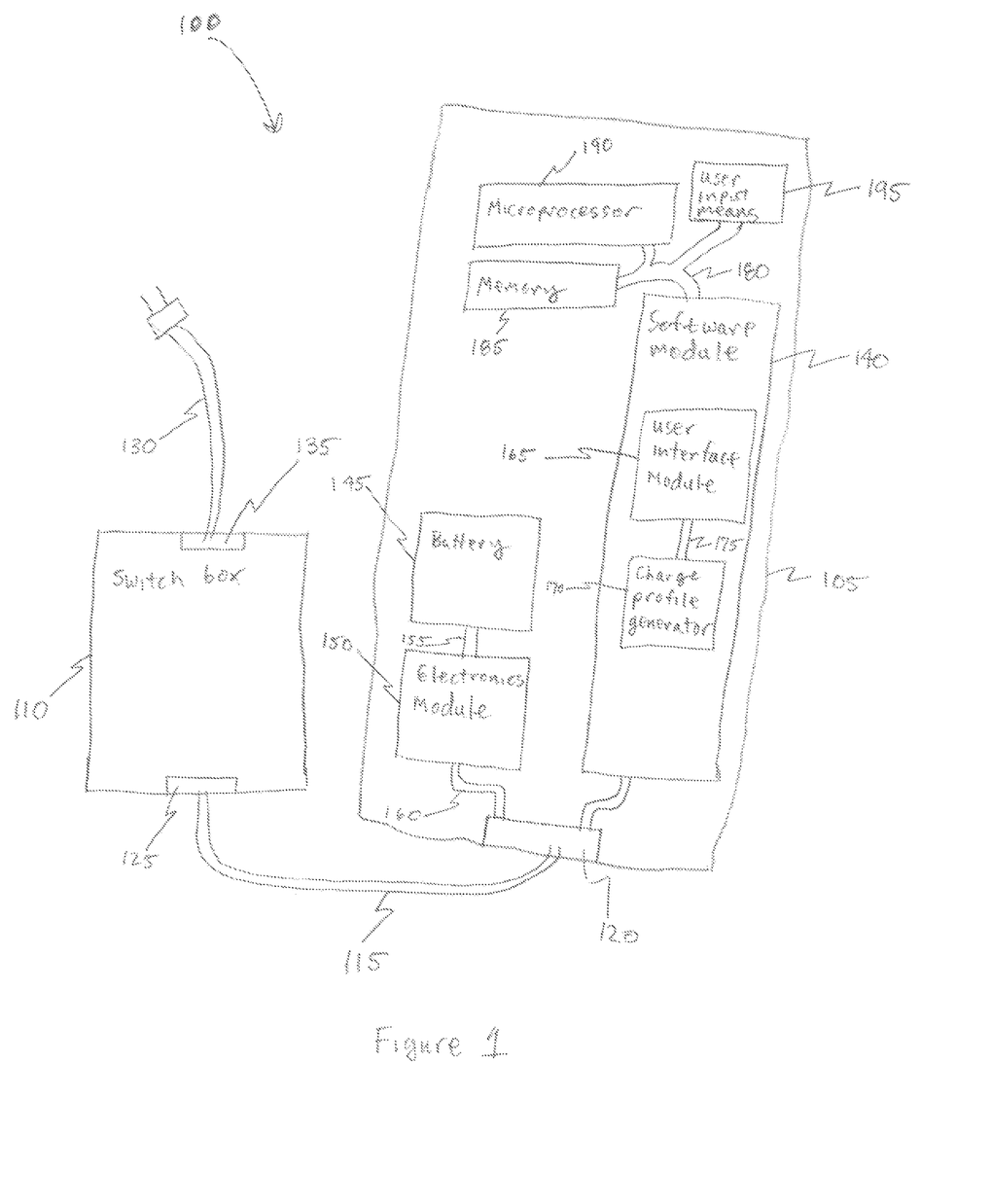
FIG. 1 shows a block diagram of a first embodiment of a battery recharging device.

FIG. 1 shows a first embodiment of a battery recharging device 100. The device comprises a mobile phone 105, a switch box 110, a first connector 115 connecting a power port 120 of the mobile phone 105 with an output port 125 of the switch box 110, and a second connector 130 adapted to connect an input port 135 of the switch box 110 with a standard electrical outlet (approximately 120 volts, 60 hertz). Preferably, the first connector 115 attaches to the output port 125 via a Universal Serial Bus ("USB") connection. The first connector 115 attaches to the mobile phone 105 based upon a connector specified by the mobile phone manufacturer for that particular model mobile phone.

Again referring to FIG. 1, the mobile phone 105 comprises a software module 140, a battery 145, and an electronics module 150 interposed between the battery 145 and the power port 120. The battery 145 is connected to the power port 120 through a third connector 155, the electronics module 150, and a fourth connector 160. The battery 145 may be any type of rechargeable battery and, illustratively, is a lithium-ion battery. The software module 140 comprises a user interface module 165 and a charge profile generator 170 which are able to communicate with each other through a fifth connector 175. The software module 140 is also connected via a communications bus 180 to a memory 185 of mobile phone 105, a microprocessor 190 of mobile phone 105, and a user input means 195 of the mobile phone 105 as shown. The user input means 195 may be any means for a user to interact with the mobile phone 105 including but not limited to touchscreens and mechanical keyboards. The software module 140 may be an application, also referred to as an "app."

Figure 2:
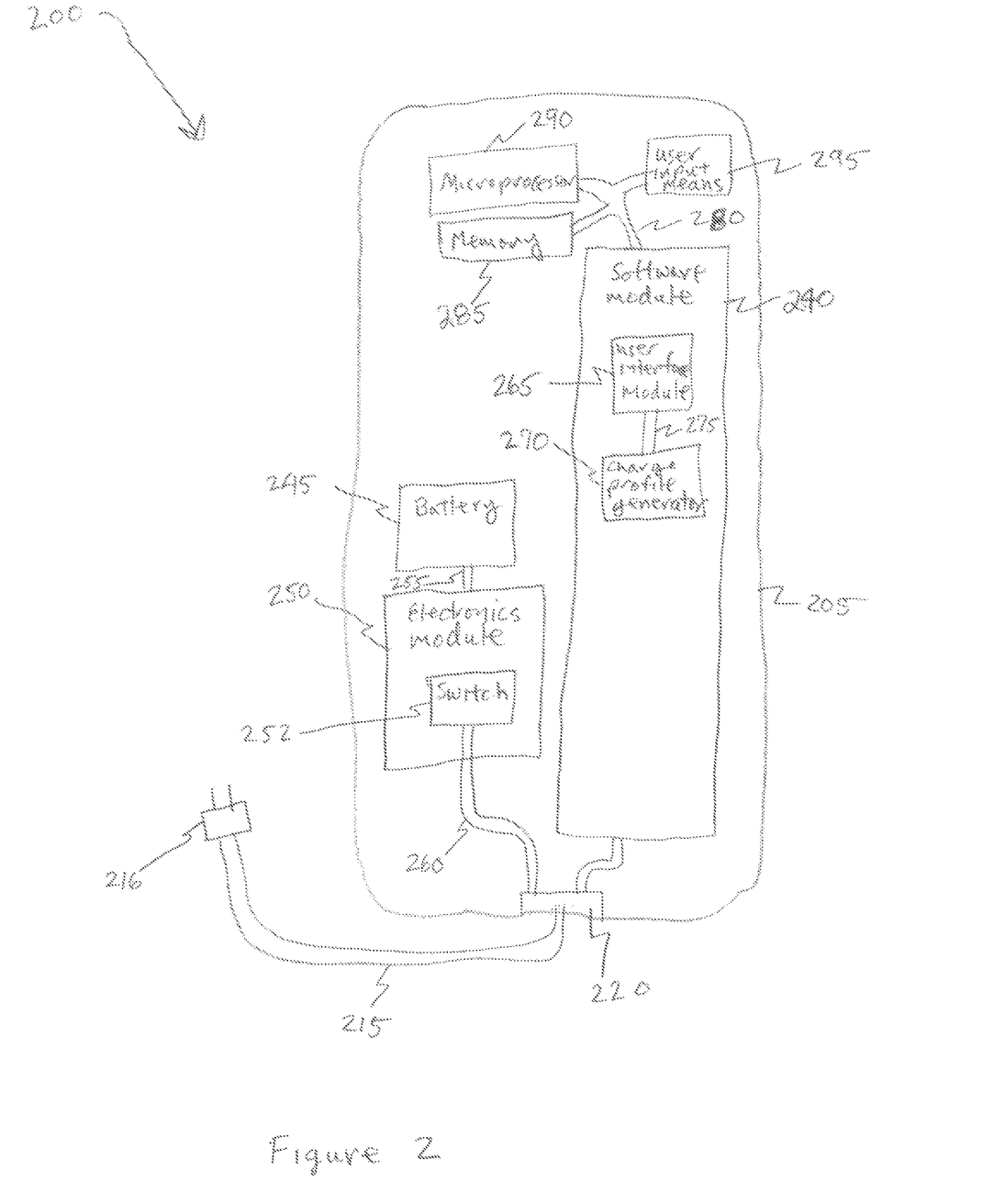
FIG. 2 shows a block diagram of a second embodiment of a battery recharging device.

FIG. 2 shows a second embodiment of a battery recharging device 200. The components of battery recharging device 200 are essentially the same as the components of battery recharging device 100 of FIG. 1 expect that the function of the switch box 110 is moved inside a mobile phone 205. More specifically, the device comprises the mobile phone 205, a first connector 215 connecting a power port 220 of the mobile phone 205 with a standard electrical outlet (approximately 120 volts, 60 hertz). Preferably, the first connector 215 attaches to a standard electrical plug 216 adapted to fit into a standard electrical outlet via a USB connection. The first connector 215 attaches to the mobile phone 205 based upon a connector specified by the mobile phone manufacturer for that particular model mobile phone.

Again referring to FIG. 2, the mobile phone 205 comprises a software module 240, a battery 245, and an electronics module 250 interposed between the battery 245 and the power port 220. The electronics module also comprises a switch 252. The battery 245 is connected to the power port 220 through a third connector 255, the electronics module 250 (including the switch 252), and a fourth connector 260. The battery 245 may be any type of rechargeable battery and, illustratively, is a lithium-ion battery. The software module 240 comprises a user interface module 265 and a charge profile generator 270 which are able to communicate with each other through a fifth connector 275. The software module 240 is also connected via a communications bus 280 to a memory 285 of mobile phone 205, a microprocessor 290 of mobile phone 205, and a user input means 295 of the mobile phone 205 as shown. The user input means 295 may be any means for a user to interact with the mobile phone 205 including but not limited to touchscreens and mechanical keyboards. The software module 240 may be an application, also referred to as an "app."

Two elements are said to be "connected" if they are directly connected, indirectly connected, adapted to be directly connected, adapted to be indirectly connected, in direct electrical communication, in indirect electrical communication, and/or adapted to be in direct and/or indirect electrical communication. For example, referring to FIG. 2, the power port 220 and switch 252 are shown as being directly connected by fourth connector 260. This connection need not be a direct connection. Similarly, referring to FIG. 1, the power port 120 is shown to be directly connected to the output port 125 of the switch box 110. Thus, in FIG. 1, a switch (not shown) inside the switch box 110 is considered "connected" to the power port 120 even though the connection is indirect and/or even though the direct and/or indirect connection may only when the mobile phone 105 is recharging.

Experimental Results and Method of Operation

In various portions of the remainder of this detailed description, when describing particular steps and referring to structures in both FIGS. 1 and 2, a shorthand shall be used wherein a slash ("/") is used between various structures of FIGS. 1 and 2. For example, the phrase "mobile phone 105/205" refers to mobile phone 105 and/or mobile phone 205 of FIGS. 1 and 2, respectively. Similarly, the phrase "software module 140/240" refers to software module 140 and/or software module 240 of FIGS. 1 and 2, respectively.

Figure 3:
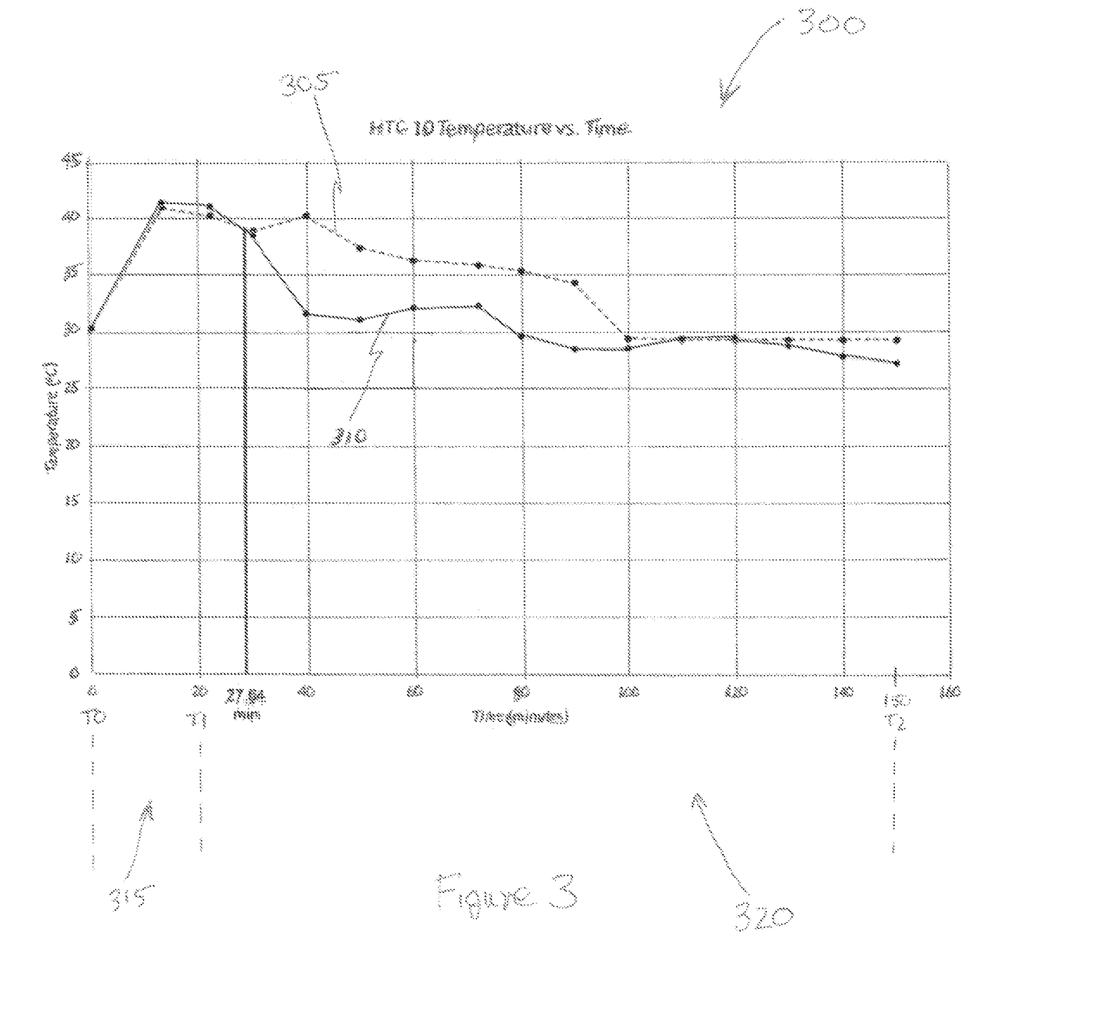
FIG. 3 shows a graph comparing the temperature over time of a device recharging using two different techniques.

FIG. 3 shows a graph 300 of temperature over time for two recharging techniques, namely a first technique and a second technique, used on a mobile phone. Graph 305, based on the first technique, shows the temperature of a model HTC 10 mobile phone while it was connected directly to a standard outlet and charging from ten percent battery capacity to 100 percent battery capacity. Graph 310, based on the second technique, shows the temperature of the same phone when it was recharged according to a charge profile 400 of FIG. 4. Graph 310 also charged the HTC mobile phone from ten percent battery capacity to 100 percent battery capacity. The temperature for both graphs represents the temperature of the model HTC 10 mobile phone. It is apparent that the higher the temperature of the model HTC 10 mobile phone, the higher the temperature of the battery (and other components) inside the model HTC 10 phone will be. The temperature was recorded using the temperature monitoring component of Cooling Master-Phone Cooler on the Google Play Store.

Again referring to FIG. 3, graph 305 was generated in 150 minutes. Likewise, graph 310 was generated in 150 minutes. As seen from graph 300, the temperature of the HTC 10 mobile phone (and thus other components such as the battery), was almost identical for the first 27.54 minutes of each experiment, with the temperature being about one degree higher for about the last half of this first time period 315, represented by the time period between T0 and T1, when the second technique was used. The time period T1 to T2 shall be referred to as the second time period 320. The first time period 315 and the second time period 320 are 27.54 minutes and 122.46 minutes, respectively. The HTC 10 mobile phone (and thus other components such as the battery) was cooler throughout the second time period 320 when the second technique was used. From T0 through T2, the inventors estimate that the areas under the graph 310 and graph 305 are 4733.1 and 5137.55, respectively. Thus, the area under graph 305 is approximately 7.6% more than the area under graph 310. In sum, for the vast majority of the 150 minutes, the second technique kept the HTC 10 mobile phone (and thus other components such as the battery) cooler, outperforming the first technique and thus, increasing battery life.

The results shown in FIG. 3 may be improved upon by modifying the second technique to reduce the peak heat of graph 310 between times T0 and T1. To accomplish this, one could divide a time sub-period ("TSP") such as TSP1 420 of FIG. 4 into multiple shorter time intervals, at least some of which will be time intervals during which no current is applied. This could reduce the peak heat of graph 310 because the battery 145/245 will heat up less during a shorter time interval, and it will cool during the time interval(s) during which no current is applied.

In the first embodiment of battery recharging device 100, the switch box 110 and other components play an important role in reducing the temperature to which the battery 145 is exposed, leading to longer battery 145 life. Similarly, in the second embodiment of battery recharging device 200, the switch 252 and other components play an important role in reducing the temperature to which the battery 245 is exposed, leading to longer battery 245 life.

By way of example, unlike prior techniques that use a "slow charge" (such as described in U.S. Pat. No. 8,922,329) which result in constant current being applied during a recharging period, the switch 252 of battery recharging device 200 does not allow current to continually be applied to the battery 245 during the recharging period. Instead, the switch 252, working in unison with other components of the battery recharging device 200, allowing a current to be applied to battery 245 based upon a charge profile generated by charge profile generator 270. Similarly, the switch box 110 of battery recharging device 100 does not allow current to continually be applied to the battery 145 during the recharging period. Instead, the switch box 110, working in unison with other components of the battery recharging device 100, allowing a current to be applied to battery 145 based upon a charge profile generated by charge profile generator 170.

Figure 4:
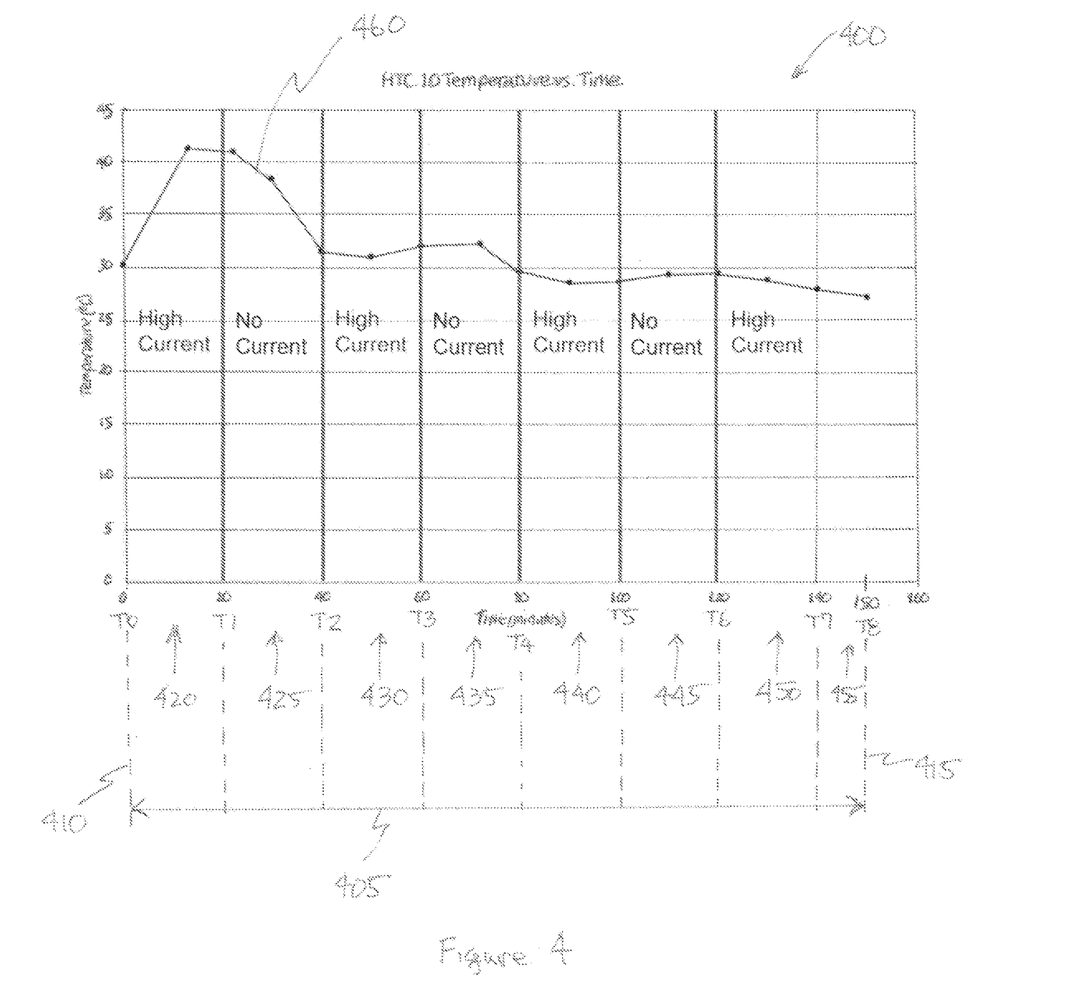
FIG. 4 discloses a charge profile used to generate a portion of FIG. 3.

FIG. 4 discloses a charge profile 400 represented by a graph of temperature over time. The charge profile 400 has a user-defined time period 405 of 150 minutes (from T0 to T8). The user-defined time period 405 has a start time 410 and an end time 415 represented by T0 and T8, respectively. The start time 410 is the time prior to which recharging does not occur based upon a user input. The end time 415 is the time after which recharging does not occur and is also based upon a user input. The user-defined time period 405 comprises eight distinct time sub-periods, namely TSP1 420, TSP2 425, TSP3 430, TSP4 435, TSP5 440, TSP6 445, TSP7 450, and TSP8 455 representing the time from T0 to T1, T1 to T2, T2 to T3, T3 to T4, T4 to T5, T5 to T6, T6 to T7, and T7 to T8, respectively wherein T0, T1, T2, T3, T4, T5, T6, T7, and T8 are times 0, 20, 40, 60, 80, 100, 120, 140, and 150 minutes, respectively.

Again referring to FIG. 4, the charge profile 400 shows whether a recharging current is to be applied to battery 145/245 during TSP1 420, TSP3 430, TSP5 440, TSP7 450, and TSP8 455. Further, the charge profile 400 called for three portions of time during which the battery 145/245 had no recharging current applied to it. These three portions are TSP2 425, TSP4, 435, and TSP6 445. Thus, in this example, the charge profile 400 is associated with a set of charges (i.e., the charges applied to battery 145/245 during TSP1 420 through TSP7 455) that will be applied to the battery during the user-defined time period (i.e., from T0 [0 minutes] through T8 [150 minutes]) wherein the set of charges comprises a first charge (e.g., the charge applied during TSP2 425 which is equal to zero) applied to the battery after the start time (i.e., T0) and prior to the end time (i.e., T8) during which the battery does not recharge. This example also shows that the set of charges is associated with an additional set of time portions (i.e., TSP4 435 and TSP6 445) within the user-defined time period during which the battery does not recharge. Thus, the charge profile 400 comprises at least one portion of time (e.g., TSP2 425) after the start time 410 and prior to the end time 415 during which the current applied to the battery is zero. During TSP1 420, TSP3 430, TSP5 440, TSP7 450, and TSP8 455, the current applied to the battery 145/245 was supplied by a 5V/2.5 A, 9V/1.7 A, 12V/1.25 A standard HTC 10 charger. A graph 460 is the graph of temperature over time as explained with respect to FIG. 3. Thus, use of charge profile 400 helps keep the battery temperature lower as compared to slow charging. The manner in which the charge profile 400 is generated and the manner in which the charge profile 400 is used to apply zero current to the battery for, e.g., multiple portions of the user-defined time period 405 is described more fully with respect to FIG. 5 and the remainder of the specification.

Figure 5:
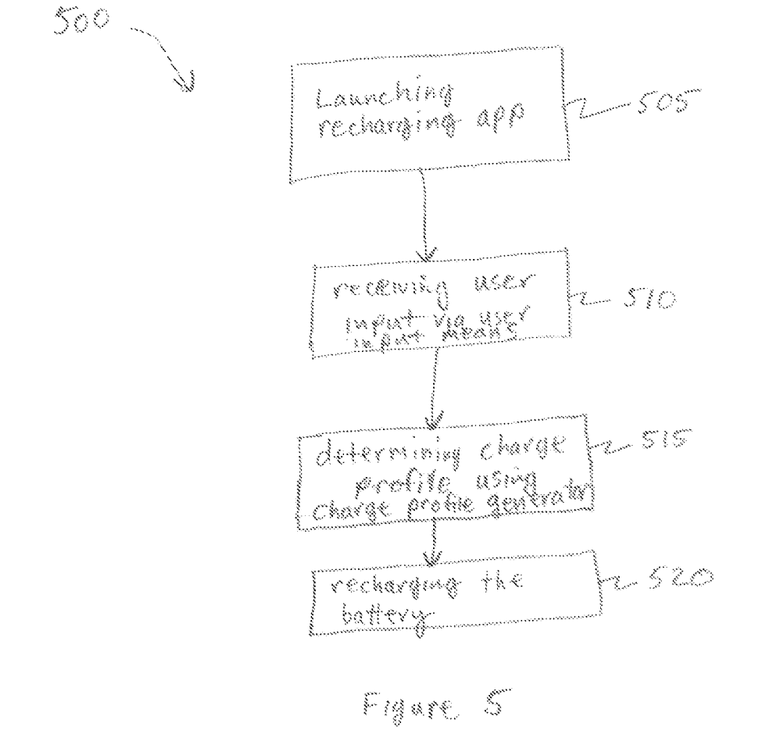
FIG. 5 comprises a flowchart showing a method of recharging a battery in accordance with the present invention.

FIG. 5 shows a flowchart 500 detailing a method of recharging a battery in accordance with the present invention and applies to methods of recharging with respect to both FIGS. 1 and 2. The description assumes all connections to a standard outlet are already complete. More specifically, with respect to FIG. 1, the description assumes the switch box 110 is connected to both the power port 120 of mobile phone 105 and a standard electrical outlet (not shown) using the first connector 115 the second connector 130 as shown in FIG. 1. Likewise, with respect to FIG. 2, the description assumes that the mobile phone 205 is connected to a standard electrical outlet (not shown) using the first connector 215 as shown in FIG. 2.

Again referring to FIG. 5, the flowchart 500 comprises a first step 505 of launching a recharging app, a second step 510 of receiving a user input due to a user entering information via the user input means 195/295, a third step 515 of determining the charge profile 400 via the profile charge generator 170/270, and a fourth step 520 of recharging the battery based upon the charge profile 400, an example of which is shown in FIG. 4. In the first step 505, the recharging app may be launched by clicking on an icon. The recharging app may also be launched when the mobile phone 105/205 senses that the first connector 115/215 is plugged into the power port 120/220. Next, in the second step 510, the recharging app will prompt the user for input via the user input means 195/295. In this example, the user input means 195/295 uses touchscreen technology well known in the art. Prior to providing additional description of the third step 515 and the fourth step 520, additional description of the first step 505 and second step 510 is provided with reference to FIG. 6.

Figure 6:
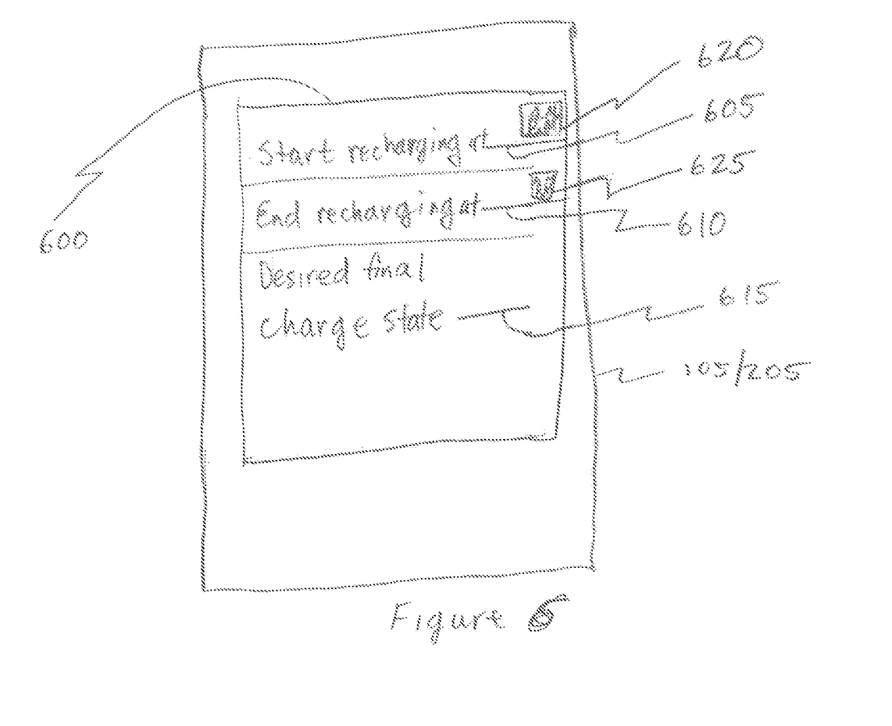
FIG. 6 shows a sample user input of the present invention.

FIG. 6 shows a mobile phone 105/205 wherein the recharging app has been activated, causing the user input means 195/295 to display a screen 600 requesting recharging information. As shown on the screen 600, the user is prompted to enter a user-defined time period 405. More specifically, the user is prompted to enter "start recharging" time in space 605, an "end recharging" time in space 610, and a "desired final charge state" in space 615. The phrases "desired final charge state" and "desired state of charge" are used interchangeably throughout this document. When the user provides entries in spaces 605 and 610, the user has provided a user-defined time period 405. Space 605 and space 610 also have A.M./P.M. selectors 620 and 625, respectively. Alternatively, the A.M./P.M. selectors 620 and 625, respectively, may be omitted if military time is used. The information input by the user is space 605, 610, and 615 is session-specific to an upcoming recharging event in that, e.g., it does not rely upon historical user usage. In other words, it will be used in the upcoming recharging event for battery 145/245 and will not be used again absent: (1) the user entering identical information for future recharging event; and/or (2) the user "saving" the information input (in, e.g., memory 185/285) as, e.g., a "favorite" to use in a future recharging event wherein the user input into the user input means 195/295 would enable the user to retrieve and designate (via, e.g., another space or set of spaces—not shown) the "favorite" stored input information as being the information to use in a future recharging event.

Again referring to FIG. 6, in other embodiments, the user-defined time period 405 is provided with a single entry in space 610. For example, the recharging app may be programmed such that it defaults to assume that the "start recharging" time is the time at which user makes the last input into the user input means 195/295. Thus, continuing with this example, if the user input means 195/295 only requests an "end recharging" time in space 610 and a "desired final charge state" in space 615, the "start recharging" time will default to use the time at which the last space (e.g., space 615) was populated by the user. Alternatively, the recharging app may be programmed such that it defaults to assume the "start recharging" time is the time at which the recharging app is activated. In the event that the charge profile generator 170/270 would not determine that charging should begin immediately, this alternative method neglects any negligible recharging that may occur between activation of the recharging app and the time at which the charge profile generator 170/270 would determine recharging should begin. In the case wherein the user-defined time period 405 is provided via a single entry in space 610, the recharging app would not prompt the user to make an entry in space 605 and instead would be programmed to, e.g., automatically populate space 605 with the current time and/or not display space 605. While this is advantageous in that it only requires the user to provide a single entry to provide a user-defined time period 405, it does not allow a cost-conscious user to specify that recharging occur when electrical rates may be the low. Thus, in this example, even though the user makes a time entry only in space 610, the user is considered to have input a "user-defined time period."

Yet again referring to FIG. 6, in preferred embodiments, the user is prompted to enter a desired final charge state for the battery 145/245 in space 615. The desired final charge state is a percentage to which the user would like to charge the battery 145/245. For example, the user may elect to only charge the battery 145/245 to 80% or 90% of the total charge the battery 145/245 is capable of holding. This is because charging the battery 145/245 to less than 100% is recommended to help increase the lifetime of the battery 145/245. Also, charging the battery 145/245 to less than 100% is also recommended for storage by some organizations. For example, Section 6.13 of the document available at https://www.riscauthority.co.uk/about/latest-news detail.new-document-release-rc61-recommendations-for-the-storage-handling-and-use-of-batteries.html states "nickel and lithium based batteries should be stored at about 40% of their full charge." Due to this, preferably, charge profile generator 170/270 may generate a charge profile 400 that serves to keep the battery at about a 40% charge for as long as possible while still serving to have the battery reach the user's desired final charge state.

Returning now to FIG. 5, the third step 515 and the fourth step 520 will now be described in more detail with reference to Appendix A.

Appendix A is source code (with comments) for one embodiment of the charge profile generator 170/270. The source code in Appendix A is written in the C computing language and is capable of running on an Arduino Beetle microcontroller. As denoted in Appendix A, the source code for charge profile generator 170/270 has three modules. A first module A100 is a module that obtains the "start recharging" time, "end recharging" time, and a "desired final charge state" from the user input means 195/295. The first module A100 contains code lines 50 to 72, inclusive. Once the user input means 195/295 passes the user input entered via screen 600 to the charge profile generator 170/270 via fifth connector 175/275, the charge profile generator 170/270 uses a second module A200 to determine the charge profile 400 based upon information received from the first module A100. The second module A200 contains code lines 73 to 164, inclusive. A third module A300 communicates with switch box 110 of FIG. 1 via various connections shown in FIG. 1 (or switch 252 of FIG. 2 via various connections shown in FIG. 2) to enable current to flow to the battery 145/245 based upon the charge profile 400. The third module A300 contains code lines 165 to 180. Lines 1 through 49 set up the use of the first module A100, the second module A200, and the third module A300. It should be noted that in Appendix A the "start recharging" time is the time at which the charge profile generator 170/270 is initiated.

The second module A200 of Appendix A shows code for the third step 515 of FIG. 5. More specifically, the second module A200 shows that part of the code used to determine the charge profile 400 is shown in, e.g., code line 95 which calculates a charge slope to be used in determining the charge profile 400.

The third module A300 of Appendix A shows code for the fourth step 520 of FIG. 5. More specifically, the third module A300 shows the actual code used to recharge the battery 145 in accordance with the charge profile 400. Also, the manner in which the charge profile 400 is used in the operation of switch box 110 of FIG. 1 to enable current to flow to the battery 145 is also shown. The charge profile 400 is used in the fourth step 520 to change the state of the switch box 110 (first embodiment) and/or the switch 252 (second embodiment) such that during the user-defined time period 405 the battery 145/245 will recharge to the desired final charge state previously entered in space 620 while also having a portion of time after the start time previously entered in space 605 and the end time previously entered in space 610 during which the battery 145/245 is not recharging. As noted previously, in some embodiments, there need not be a start time entered due to the use of default values. Also, as used herein, start time and end time are synonymous with, e.g., the "start recharging" time and "end recharging" time entered in space 605 and 610, respectively. One may use many known techniques in the switch box 110 to ensure this occurs, including, e.g., a relay switch. Also as well know, one may use various components, such as a set of one or more transistors, to create switch 252. More generally, those skilled in the art realize that there are many ways to enable current to flow to the battery 245 of FIG. 2 using switch 252 which may be comprised of hardware (such as a transistor and/or other electronics), software, firmware or a combination thereof.

Those skilled in the art will realize that the charge profile 400 shown in FIG. 4 and discussed in this detailed description was for the HTC 10 mobile phone recharging with a user-defined time period of 150 minutes and that other charge profiles for the HTC 10 mobile phone may vary due to a change to any or all of the user inputs (e.g., there may be a larger or smaller user-defined time period and/or a different desired final charge state). Those skilled in the art will also realize that other charge profiles may differ due to the battery being recharged being in a device other such as a laptop and/or portable computer, a personal digital assistant, a tablet, a camcorder, a power tool, an automobile, and/or another vehicle, or any other device using a rechargeable battery and that this invention may be used with any such device.

Additionally, while various embodiments of the present invention have been shown and described, various modifications to those embodiments may be made. These modifications include, but are not limited to:

1) the battery 145/245 being any other type of rechargeable battery, not only a lithium-ion battery;

2) the communication paths and connections being implemented using various technologies and topologies such as a communication bus;

3) the memory 185/285 being any type of memory including Random Access Memory (RAM), flash memory, Read Only Memory (ROM), Electrically Programmable ROM (EPROM), Electrically Erasable Programmable ROM (EEPROM), registers, hard disk, or any other form of storage medium known in the art;

4) the microprocessor being any type of processor including a processor, controller, microcontroller, or state machine. The processor may also be implemented as a combination of computing devices, e.g., a combination of a Digital Signal Processor (DSP) and a microprocessor, a plurality of microprocessors, one or more microprocessors in conjunction with a DSP core, or any other such configuration;

5) the software module 140/240 being implemented software, hardware, firmware or any combination thereof. Further, to the extent implemented in anything other than hardware, the software module may be stored in any type of memory device including but not limited to those identified in (3) above;

6) the user input means being voice activated and one wherein the user is able to enter user inputs via voice;

7) the charging of the battery being performed wirelessly;

8) the charging of the battery being performed in accordance with any USB protocol including but not limited to those referenced at http://www.usb.org/developers/power-delivery/;

9) the user input being able to be overridden by the user. This may occur, for example, if after the recharging begins, the user must shorten or lengthen the user-defined time period due to a change in plans;

10) the switch box 110 having multiple ports (e.g., USB ports) enabling the user to recharge batteries on multiple devices simultaneously by using a single recharging app; and/or 11) any combination of features such as, e.g., the microprocessor, memory, and software module, may reside in an Application Specific Integrated Circuit (ASIC).

Those skilled in the art will realize and appreciate many other variations and modifications may be made to the invention that are within the claims. Thus, the previously described embodiments are provided to enable any person skilled in the art to make or use the present invention. Various modifications to these exemplary embodiments will be readily apparent to those skilled in the art and may be applied in other embodiments without departing from the spirit or scope of the invention. Thus, the present invention is not intended to be limited to the embodiments shown herein but is to be accorded the broadest scope consistent with the claims.

What is claimed is:

1. A method of recharging a battery comprising:
receiving a user input comprising a user-defined time period, the user-defined time period signifying a start time and an end time, the start time being a first time prior to which recharging does not occur, the end time being a second time after which recharging does not occur, with a plurality of alternating charge and rest segments occurring between the start time and the end time, the charge segments being periods during which recharging current is to be applied to the battery, and the rest segments being periods during which no recharging current is to be applied to the battery;

based upon the user-defined time period, determining a recharging profile configured to mitigate heat accumulation in the battery throughout the user-defined time period, the recharging profile associated with a plurality of alternating charge and rest segments, the charge segments and rest segments alternating at least twice during the user-defined time period;

recharging the battery based upon the recharging profile; and wherein the rest segments of the plurality of alternating segments in the recharging profile are adapted to decrease heat accumulation in the battery caused by each charge segment of the plurality of charge segments and within the user-defined time period to increase battery longevity.

2. The method of claim 1 wherein the rest segments are associated with a set of time portions within the user-defined time period during which the battery does not recharge.

3. The method of claim 1 wherein the battery is a lithium-ion battery.

4. The method of claim 1 wherein the user input is session-specific and relates to an upcoming recharging event.

5. The method of claim 1 wherein the user input further comprises a final desired state of charge.

6. The method of claim 5 wherein the final desired state of charge is greater than seventy percent and less than one hundred percent.

7. The method of claim 1 wherein the recharging step comprises applying a charging current associated with the charging profile to the battery using a USB connection.

8. A device for recharging a battery comprising:
a power port;
a user interface module for receiving a user input, the user input comprising a user-defined time period, the user-defined time period signifying a start time and an end time, the start time being a first time prior to which recharging does not occur, the end time being a second time after which recharging does not occur, with a plurality of charge and rest segments occurring between the start time and the end time, the charge segments being periods during which recharging current is to be applied to the battery, and the rest segments being periods during which no recharging current is to be applied to the battery;
a recharging profile generator for producing a recharging profile, the charge recharging profile generator responsive to the user input, the recharging profile associated with the plurality of segments alternating between charge segments and rest segments at least twice;
a switch connected to the power port for enabling a current to flow to the battery based upon the recharging profile; and
wherein the charge segments of the plurality of alternating segments are applied to recharge the battery, and the rest segments of the plurality of alternating segments are applied to reduce heat accumulation in the battery throughout the user-defined time period to increase battery longevity, the heat accumulation being attributable to the charge segments within the user-defined time period.

9. The device of claim 8 wherein the rest segments are associated with a set of time portions within the user-defined time period during which the battery is not adapted to recharge.

10. The device of claim 8 wherein the battery is a lithium ion battery.

11. The device of claim 8 wherein the user input is session-specific and relates to an upcoming recharging event.

12. The device of claim 8 wherein the user input further comprises a final desired state of charge.

13. The device of claim 12 wherein the final desired state of charge is greater than seventy percent and less than one hundred percent.

14. The device of claim 8 wherein the power port comprises a USB port.

15. A device for recharging a battery comprising:
a power port;
a recharging profile generator for producing a recharging profile, the recharging profile associated with a plurality of alternating charge and rest segments that are adapted to be applied to the battery over a recharging period beginning at a start point and ending at an end point, the charge period comprising a plurality of charge and rest segments occurring between the start point and the end point, the charge segments being periods during which recharging current is to be applied to the battery, and the rest segments being periods during which no recharging current is to be applied to the battery, the charge segments and rest segments alternating at least twice;
a switch connected to the power port for enabling a current to flow to the battery based upon the recharging profile; and
wherein the charge segments of the plurality of alternating segments are applied to recharge the battery, and the rest segments of the plurality of alternating segments are applied to reduce heat accumulation in the battery throughout the recharging period to increase battery longevity, the heat accumulation being attributable to the charge segments within the recharging period.

16. The method of claim 1, wherein each charge segment in the plurality of charge and rest segments is 15 seconds to 10 minutes in duration.

17. The device of claim 8, wherein charge segment in the plurality of charge and rest segments is 15 seconds to 10 minutes in duration.

18. The device of claim 15, wherein each charge segment in the plurality of charge and rest segments is 15 seconds to 10 minutes in duration.

19. The method of claim 2 wherein the additional set of time portions comprises at least ten time portions.

20. The method of claim 9 wherein the additional set of time portions comprises at least ten time portions.

21. The method of claim 1 further comprising the step of dynamically updating the recharging profile.

* * * * *